United States Patent [19]

Masunaga et al.

[11] Patent Number: 4,863,340
[45] Date of Patent: Sep. 5, 1989

[54] SYSTEM FOR LOADING PRODUCTS OF SHEET GLASS

[75] Inventors: Hiroaki Masunaga; Hiroshi Inoue; Masaaki Sakamoto; Norihiko Higashide, all of Osaka, Japan

[73] Assignee: Nippon Sheet Glass Co., Ltd., Osaka, Japan

[21] Appl. No.: 94,412

[22] Filed: Sep. 8, 1987

[30] Foreign Application Priority Data

Sep. 8, 1986 [JP] Japan ............................ 61-137541[U]
Sep. 8, 1986 [JP] Japan ............................ 61-137542[U]
Sep. 8, 1986 [JP] Japan ............................ 61-137544[U]

[51] Int. Cl.⁴ ............................................. B65G 61/00
[52] U.S. Cl. .................................. 414/789.5; 271/106;
294/65; 294/907; 414/728; 414/737; 414/798.5
[58] Field of Search .................. 271/308, 312, 106;
294/65, 907; 414/42, 330, 107, 728, 737, 798.5,
789.5

[56] References Cited

U.S. PATENT DOCUMENTS

| | | | |
|---|---|---|---|
| 3,279,664 | 10/1966 | Lynch .............................. | 414/330 X |
| 3,326,547 | 6/1967 | Walters et al. ................... | 414/107 X |
| 3,866,764 | 2/1975 | Leiser .............................. | 294/65 X |
| 4,093,083 | 6/1978 | Klaus ............................... | 414/107 |
| 4,420,361 | 12/1983 | Valimont et al. ................. | 414/42 X |
| 4,623,296 | 11/1986 | McGuire et al. ................. | 414/42 X |
| 4,633,581 | 1/1987 | Villanueva ........................ | 29/822 |

FOREIGN PATENT DOCUMENTS

| | | |
|---|---|---|
| 44245 | 1/1982 | European Pat. Off. ............ 294/907 |
| 1431710 | 3/1965 | Fed. Rep. of Germany . |
| 3438268 | 8/1987 | Fed. Rep. of Germany . |
| 112233 | 7/1982 | Japan ..................... 414/42 |
| 1181757 | 9/1985 | U.S.S.R. ................ 294/65 |

OTHER PUBLICATIONS

Co-pending application Ser. No. 010,986, filed 2/5/87 by assignee, Nippon Sheet Glass Co., Ltd.

Primary Examiner—Robert J. Spar
Assistant Examiner—Janice Krizek
Attorney, Agent, or Firm—Lowe, Price, LeBlanc, Becker & Shur

[57] ABSTRACT

An automatic loading system includes an automatic loading apparatus for automatically loading, onto a pallet, a glass sheet product as it lies substantially horizontally and is delivered along a feed path to a terminal position of the feed path. The automatic loading apparatus has a suction mechanism for attracting the lower surface of the glass sheet product at the terminal position and for moving the glass sheet product to a loading position to load the glass sheet product onto the pallet. The automatic loading system also includes an apparatus for putting an interleaving sheet on an upper surface of the glass sheet product in the feed path. The interleaving sheet putting apparatus comprises a mechanism for moving an uppermost interleaving sheet of a stack of interleaving sheets over the glass sheet product, and a holder mechanism for holding the uppermost interleaving sheet against an upper surface of the glass sheet product. The pallet has at least a pair of spacers having spaced grooves defined therein for receiving the lower edges of the glass sheet products. The suction mechanism comprises detectors for detecting distances between the glass sheet product in the loading position and a glass product previously loaded on the pallet.

17 Claims, 8 Drawing Sheets

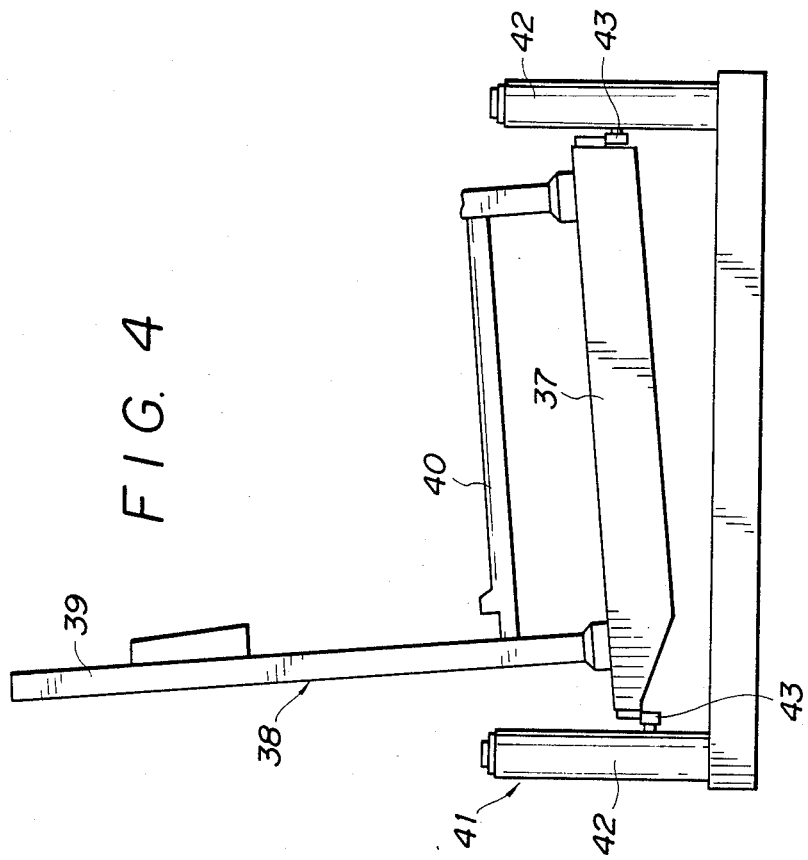
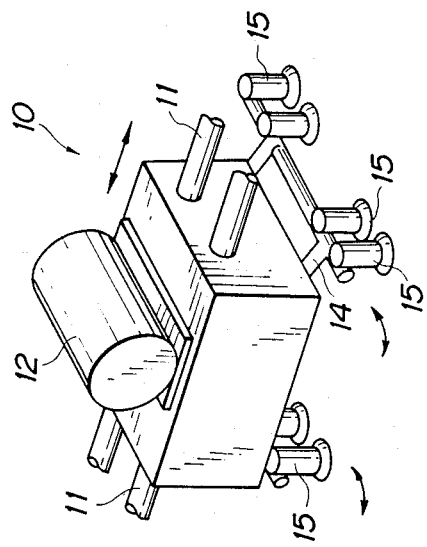
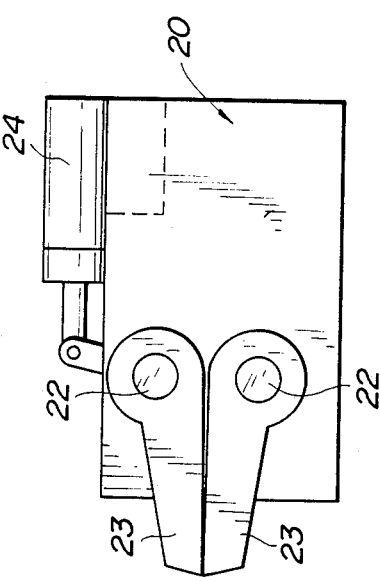

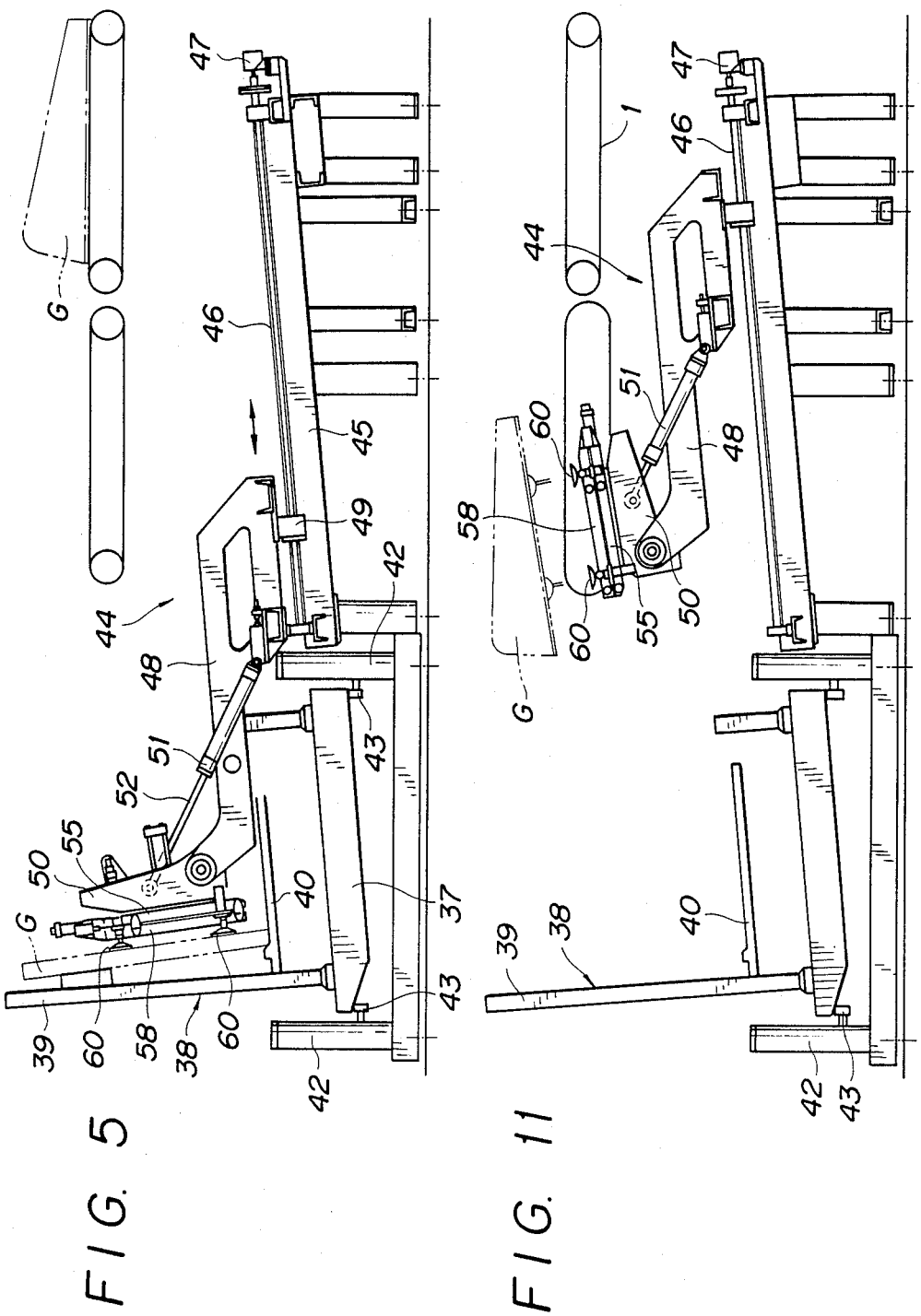

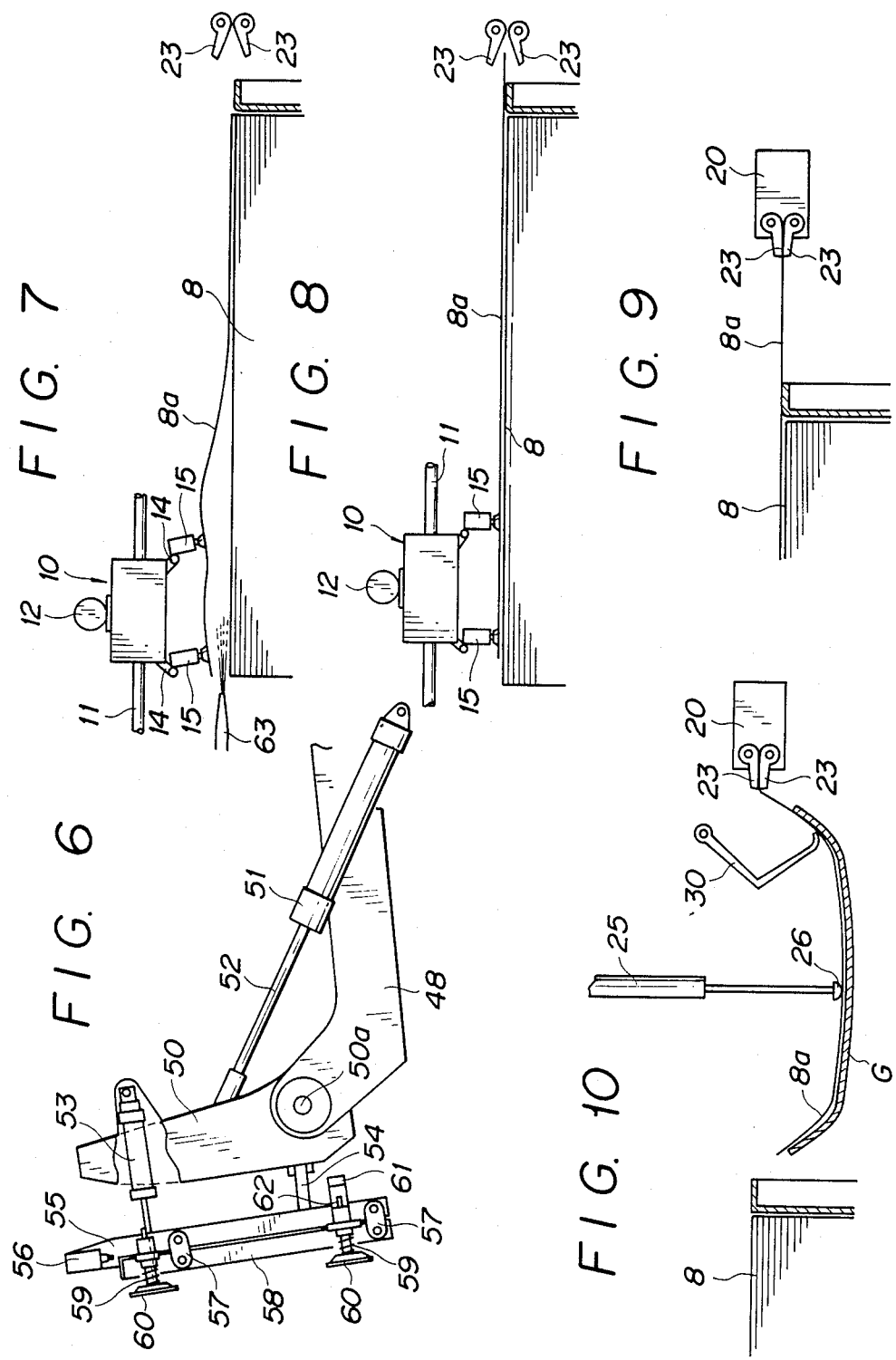

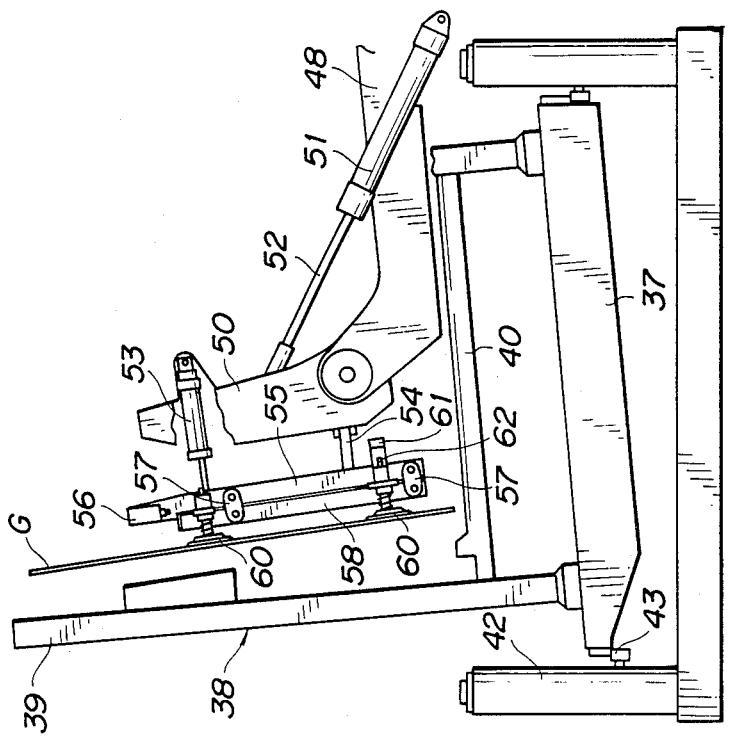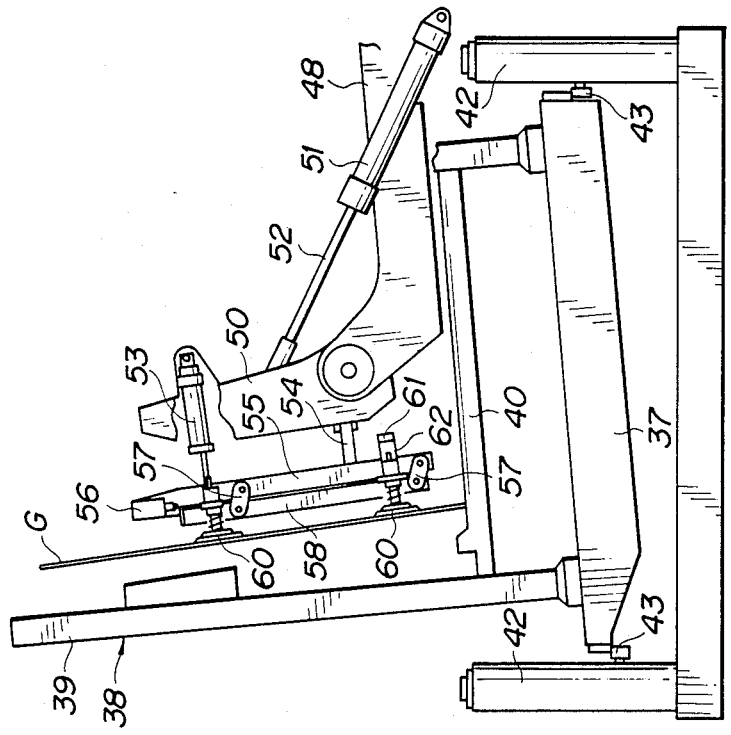

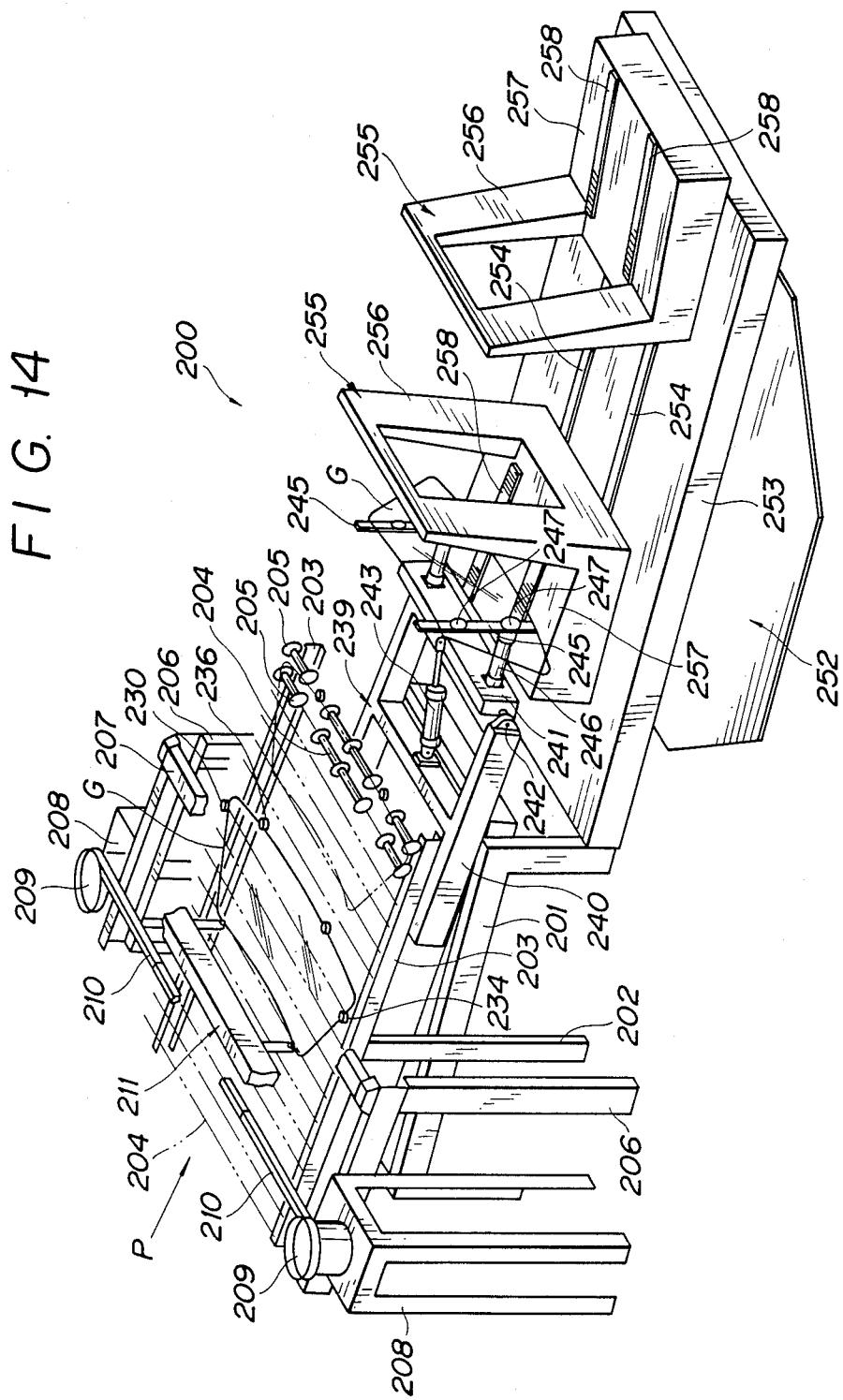

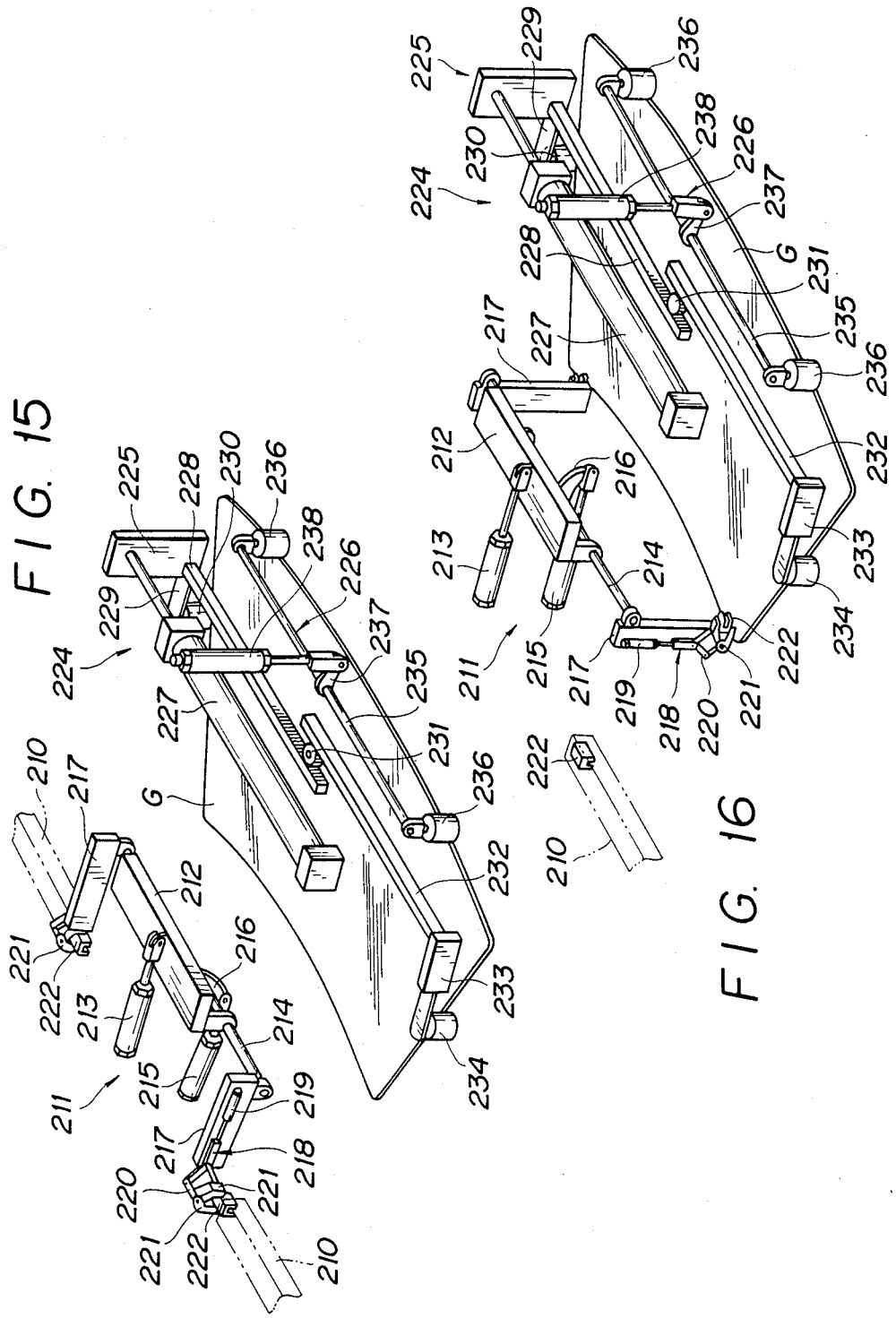

SYSTEM FOR LOADING PRODUCTS OF SHEET GLASS

BACKGROUND OF THE INVENTION

1. Field of the Invention

The present invention relates to a system for loading products of sheet glass, and more particularly to a loading system for loading a number of glass sheet products such as automotive window glass sheets onto a pallet.

2. Description of the Relevant Art

Glass sheet products such as automotive window glass sheets are loaded as a horizontal stack on a pallet after a certain fabrication process. Thereafter, the stacked glass sheet products on a pallet are transferred, together with the pallet, to a next process. When loading glass sheet products onto a pallet, it is general practice to place interleaving sheets between the glass sheet products for preventing the glass sheet products from being damaged due to direct contact with each other. Such interleaving sheets are normally made of paper. Where glass sheet products are rear window glass sheets printed with silver paste in a pattern of defrosting heating wires, such a silver paste pattern would tend to be transferred to intervening sheets. One solution has been to fit packings over the peripheral edges of rear window glass sheets, rather than employing interleaving sheets.

For placing an interleaving sheet between window glass sheets, the interleaving sheet is put on the upper surface of a glass sheet that has been conveyed horizontally before the glass sheet is loaded onto a pallet. Thereafter, the glass sheet is loaded onto the pallet. Since the manual procedure for putting an interleaving sheet on a glass sheet is poor in efficiency, there has been developed an apparatus for automatically putting an interleaving sheet on a glass sheet. In such an automatic apparatus, the uppermost one of a stack of interleaving sheets is attracted and lifted by a plurality of suction cups. After the interleaving sheet has been moved to a desired position, it is gripped by clamps, and then released from the suction cups. The interleaving sheet is moved over a glass sheet by moving the clamps, where the interleaving sheet is unclamped to fall onto the glass sheet. The automatic interleaving sheet putting apparatus is of a higher production rate than the manual procedure. There has also been employed an apparatus for automatically loading a glass sheet product onto a pallet because a manual loading process is low in efficiency. The glass product loading apparatus has suction cups for lifting a glass sheet product lying horizontally and loading the glass sheet onto a pallet, the suction cups communicating with a vacuum suction device. Rear window glass sheets with silver paste printed on their upper surfaces are not suitable for being loaded onto a pallet by such an automatic loading apparatus. Therefore, in practice, a glass sheet product with an interleaving sheet put thereon is loaded onto a pallet by such an automatic loading apparatus.

In the above automatic loading apparatus, the glass sheet product is attracted by the suction cups through the interleaving sheet. Therefore, there are limitations on the material of the interleaving sheet that can be used, and there is a possibility for the glass sheet product to be not sufficiently attracted by the suction cups of the loading apparatus. This problem manifests itself especially when the glass sheet product is curved.

The interleaving sheet putting apparatus is required to attract at least the four corners and center of an interleaving sheet in order to reliably lift the interleaving sheet while maintaining the flat shape thereof. Therefore, the suction mechanism is of necessity large in size with the result that the interleaving sheet putting apparatus is also large in size. When attracting the uppermost interleaving sheet, an interleaving sheet therebeneath may also be attracted, resulting in an unwanted consumption of interleaving sheets. Where a glass sheet product is curved to a relatively large extent, an interleaving sheet may not properly drop onto the glass sheet product.

In the automatic loading apparatus, a glass sheet product is released from the suction cups without concern over the gap between the glass sheet product and the preceding glass sheet product that has been loaded on the pallet, as shown in FIG. 19 of the accompanying drawings, which is a plan view of the pallet. The glass sheet product G is loaded onto the pallet 300 such that the lower edge of the glass sheet product G will fit into one of grooves 303 defined at equal intervals in a pair of spacers 302 extending parallel to each other and fixed to a bottom plate 301 of the pallet 300. Unless care were taken to position glass sheet products G parallel to each other, the lower edges of the sheet products G might not fit properly in the respective grooves 303. For example, the lower edge of a newly loaded glass sheet product G may fit in grooves 303 out of parallel to the previously loaded glass sheet products G with one groove 303 in one of the spacers 302 being left empty between the newly loaded glass sheet product G and the previously loaded glass sheet products G.

The present invention has been made in an effort to effectively eliminate the various problems with the conventional system for loading glass sheet products such as automotive window glass sheets.

SUMMARY OF THE INVENTION

It is an object of the present invention to provide an automatic glass sheet product loading system having a loading apparatus capable of reliably attracting glass sheet products regardless of the material of interleaving sheets used even where the glass sheet products are largely curved.

Another object of the present invention is to provide a glass sheet product loading system having an interleaving sheet putting apparatus capable of reliably putting an uppermost interleaving sheet on glass sheet products even where the glass sheet product is largely curved.

Still another object of the present invention is to provide an automatic glass sheet product loading system having an automatic loading apparatus capable of fitting the lower edge of a glass sheet product precisely in prescribed grooves of a pallet.

To achieve the above objects, there is provided a system for automatically loading glass sheet products one by one onto a pallet, comprising a conveyor apparatus for delivering a glass sheet product as it lies substantially horizontally along a feed path to a terminal position of the feed path, and an automatic loading apparatus for automatically loading the delivered glass sheet product onto the pallet, the automatic loading apparatus comprising a main body movable between the terminal position and a loading position for loading the glass sheet product onto the pallet, and a suction mechanism mounted on the main body for attracting the lower surface of the glass sheet product at the terminal position and for releasing the lower surface of the glass sheet product at the loading position to load the glass sheet product onto the pallet.

The system further includes an apparatus for putting an interleaving sheet on an upper surface of the glass sheet product in the feed path, the apparatus comprising an interleaving sheet supply mechanism disposed on one side of the feed path for moving one side of an uppermost interleaving sheet of a stack of interleaving sheets from the remaining interleaving sheets toward the feed path, a clamp mechanism for gripping the one side of the uppermost interleaving sheet, a mechanism for moving the clamp mechanism beyond the glass sheet product in the feed path to one side of the glass sheet product thereby to move the uppermost interleaving sheet over the glass sheet product, and a holder mechanism for holding the uppermost interleaving sheet against the upper surface of the glass sheet product.

The pallet has at least a pair of spacers having spaced grooves defined therein for receiving the lower edges of the glass sheet products, the suction mechanism comprising a support angularly movably mounted on the main body, an extensible and contractable cylinder connected between the support and the main body, a pair of plates mounted on the support movably therefrom, extensible and contractable cylinders connected between the support and the plates, suction pads mounted on the plates, and detectors mounted on the plates for detecting distances between the glass sheet product attracted to the suction pads and a glass sheet product previously loaded on the pallet, and wherein each of the suction pads releases the glass sheet product to allow the lower edge of the glass sheet product to engage in the grooves of the spacers when the distances as detected by the detectors between the glass sheet product attracted to the suction pads and the glass sheet product previously loaded on the pallet are equal to prescribed distances.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 2 is a perspective view of an interleaving sheet supply mechanism of the loading system;

FIG. 3 is an enlarged side elevational view of a clamp of an interleaving sheet putting apparatus of the loading system;

FIG. 4 is a side elevational view of a pallet used in the loading system;

FIG. 5 is a side elevational view of an automatic glass sheet product loading apparatus of the loading system;

FIG. 6 is an enlarged fragmentary side elevational view of the automatic loading apparatus shown in FIG. 5;

FIGS. 7 through 10 are views showing a sequence of steps of putting an uppermost interleaving sheet on glass sheet products;

FIG. 11 is a side elevational view of the automatic loading apparatus as it is in a standby condition;

FIGS. 12 and 13 are views showing a process of adjusting the height of a pallet in the automatic loading apparatus;

FIG. 14 is a perspective view of an automatic glass sheet product loading system according to a second embodiment of the present invention;

FIGS. 15 and 16 are perspective views explaining operation of a packing applying apparatus and a glass sheet product aligning apparatus of the loading system shown in FIG. 14;

DETAILED DESCRIPTION OF THE PREFERRED EMBODIMENTS

Figure 1:
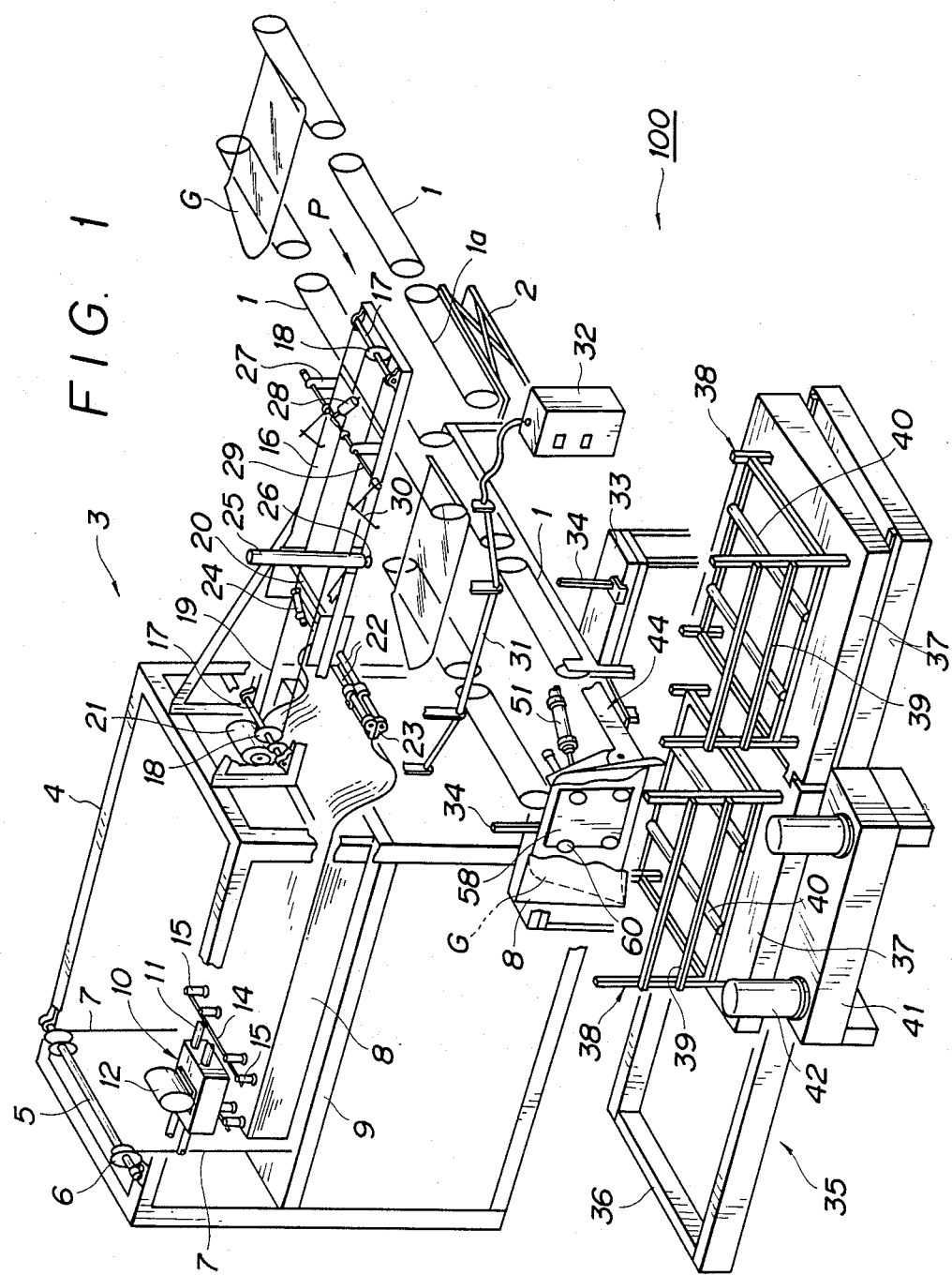
FIG. 1 is a perspective view of an automatic glass sheet product loading system according to a first embodiment of the present invention.
Figure 19:
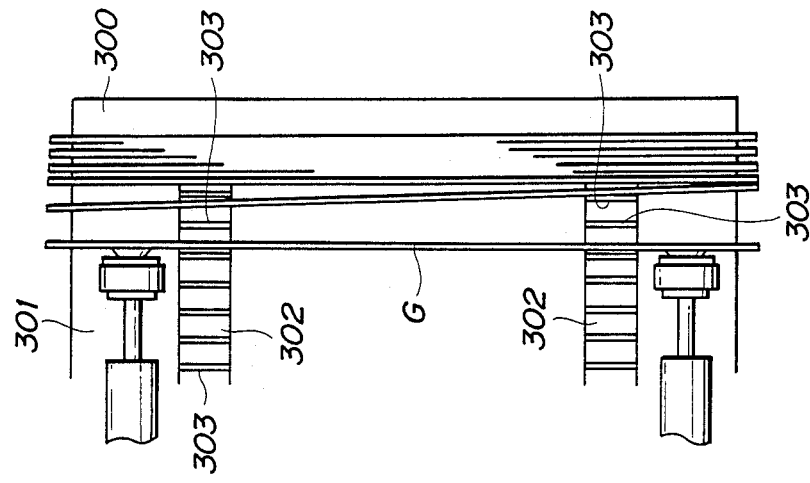
FIG. 19 is a view illustrating the manner in which a glass sheet product is loaded onto a pallet in a conventional automatic loading system.

FIG. 1 shows an automatic glass sheet product loading system, generally designated by the reference numeral 100, according to the present invention. By way of example, glass sheet products shown are automative front windshields G of curved shape. The loading system 100 has conveyor belts 1 for delivering glass sheets G along a feed path P. The conveyor belts 1 which are positioned in an upstream area of the feed path P are lower than the conveyor belts 1 located in a downstream area of the feed path P. The intermediate conveyor belts 1a are disposed on a lifter 2 for moving glass sheets G from the upstream belts 1 to the downstream belts 1.

An interleaving sheet putting apparatus 3 is disposed on one side of the feed path P. The interleaving sheet putting apparatus 3 has a frame 4 with a shaft 5 extending in its upper portion. The shaft 5 supports on its opposite ends pulleys 6 around which there are trained wires 7 fixed at their lower ends to a vertically movable table 9 carrying a stack of interleaving sheets 8 of paper thereon. The shaft 5 is rotated about its own axis by a motor (not shown) to cause the wires 7 to move the table 9 vertically for bringing an uppermost interleaving sheet 8a into a prescribed position. An interleaving sheet supply mechanism 10 is disposed above the table 9 within the frame 4. The interleaving sheet supply mechanism 10 is mounted on rods 11 extending perpendicularly to the feed path P and movable axially on the rods 11.

As shown in FIG. 2, the supply mechanism 10 has front and rear arms 14 angularly movable in the direction of the arrow by means of a motor 12. Each of the arms 14 supports suction cups or pads 15 communicating with a vacuum suction mechanism (not shown).

In FIG. 1, a rail 16 is mounted on an upper portion of the frame 4, the rail 16 being positioned above the feed path P and having a longitudinal axis normal to the feed path P. Two shafts 17 are mounted on the rail 16 at its opposite ends, the shafts 17 extending parallel to the feed path P. The shafts 17 centrally support respective sprockets 18 around which a chain 19 is trained. The chain 19 has a portion fixed to a movable body 20 movably mounted on the rail 16. The shafts 17 are rotated by a motor 21 to cause the chain 19 to travel in one direction to move the movable body 20 in a direction normal to the feed path P.

As also shown in FIG. 3, the movable body 20 has a pair of vertically spaced shafts 22 each supporting clamps 23 secured to the opposite ends thereof. The upper shaft 22 is angularly movable about its own axis by means of a cylinder 24, and the lower shaft 22 is angularly movable about its own axis through a suitable meshing mechanism by the upper shaft 22. Therefore, the upper and lower shafts 22 are angularly movable in opposite directions so that the clamps 23 in each mating pair can move toward and away from each other.

A holder cylinder 25 is fixed to one side of the rail 16 and has a vertically movable rod with a holder pad 26 attached to the lower end thereof. Brackets 27 are vertically attached to the opposite sides of the rail 16 for supporting the opposite end portions of a shaft 29 rotatably, the shaft 29 supporting tracing arms 30 on its opposite ends. The shaft 29 is rotated about its own axis by a cylinder 28.

A charging electrode 31 connected to a static electricity generator 32 is disposed above the feed path P downstream of the rail 16 in the direction of travel of the glass sheets G down the feed path P. A frame 33 to which there are attached alignment rods 34 movable in a direction normal to the feed path P is disposed below the feed path P downstream of the charging electrode 31. The alignment rods 34 serve to correct the attitude of glass sheets G.

A pallet exchanger 35 is positioned at the downstream end of the feed path P. The pallet exchanger 35 has a frame 36 on which there are supported bases 37 that are movable in a direction normal to the feed path P, the bases 37 supporting pallets 38. As shown in FIG. 4, each pallet 38 comprises a bottom plate 40 and a back plate 39 attached perpendicularly to the bottom plate 40. The pallet 38 is bodily tilted such that the side of the bottom plate 40 near the feed path P is higher than the opposite side thereof. Therefore, glass sheets G as they are loaded on the pallets 38 are stabilized. The pallet exchanger 35 also has a pallet lifting/lowering mechanism 41 comprising support members 43 movable vertically by respective motors 42. The base 37 supporting one of the pallets 38 which is in a working position is placed on the support members 43. When the motors 42 are energized, the base 37 and the pallet 38 are moved vertically in unison. As shown in FIG. 1, the other pallet 38 is coupled to said one pallet 38 through dovetail joints so that the pallets 38 are vertically movable relatively to each other. Therefore, even when one pallet 38 is vertically moved, the other pallet 38 remains still.

Between the pallet exchanger 35 and the alignment rods 34, there is disposed an apparatus 44 downstream of the feed path P for automatically attracting and loading a glass sheet G onto a pallet. As shown in FIG. 5, the loading apparatus 44 has a frame 45 and a ball screw 46 mounted on the frame 45 and having an axis inclined at the same angle as the bottom plates 40 of the pallets 38. One end of the ball screw 46 is coupled to a motor 47 fixed to the frame 45 for rotating the ball screw 46 about its own axis. A nut member 49 fixed to the lower surface of a main body 48 of the loading apparatus 44 is threaded over the ball screw 46. When the motor 47 is energized, the ball screw 46 is rotated about its own axis to cause the nut member 49 to move the main body 48 along the axis of the ball screw 46 in the direction of the arrow (FIG. 5).

As shown in FIG. 6 in greater detail, a head 50 is pivotally coupled by a shaft 50a to the front end of the main body 48. A cylinder unit 51 with its one end coupled to the main body 48 has a rod 52 having a distal end joined to the rear central portion of the head 50. The head 50 is turned about the shaft 50a in response to expansion and contraction of the rod 52. A rear plate 55 is attached to the head 50 through a tracing balancer cylinder 53 actuatable by low-pressure air and a guide rod 54. A limit switch 56 is fixed to the upper end of the rear plate 55 for detecting the height of the pallet 38. A front plate 58 is coupled to the rear plate 55 through swingable links 57. A plurality of suction pads or cups 60 are mounted on the front surface of the front plate 58, the suction pads 60 being normally urged in a direction away from the front plate 58 by means of springs 59. The suction pads 60 communicate with a vacuum suction mechanism (not shown). The lower suction pad 60 is integral with an actuator member 62 for operating a load position detecting limit switch 61 fixed to the rear surface of the front plate 58.

The automatic loading system 100 will operate as follows:

A glass sheet product G lying horizontally is conveyed along the feed path P by the conveyor belts 1 to a position below the rail 16.

At the same time, the suction pads 15 of the supply mechanism 10 attract the upper surface of the rear portion of the uppermost interleaving sheet 8a while the arms 14 are being maintained with the suction pads 15 directed downwardly. Then, as shown in FIG. 7, the arms 14 are swung toward the front end of the attracted interleaving sheet 8a, i.e., toward the feed path P, and air is applied by a nozzle 63 between the attracted interleaving sheet 8a and the next interleaving sheet 8. As a result, the interleaving sheet 8a is lifted over the next interleaving sheet 8 by the low-pressure air, and moves toward the feed path P. The front edge of the interleaving sheet 8a thus projects from the sheet stack 8 toward the feed path P into a position between the clamps 23, as shown in FIG. 8. Thereafter, the interleaving sheet 8a is released from the suction pads 15.

Then, the cylinder 24 is operated to cause the clamps 23 to grip the front edge of the interleaving sheet 8a, as shown in FIG. 9. The motor 21 is energized to move the chain 19 and hence the movable body 20 fixed to the chain 19 along the rail 16 across and over the glass sheet G. As a consequence, the interleaving sheet 8a is positioned above the glass sheet G. The cylinder 28 is actuated to swing the tracing arms 30 downwardly. The tracing arms 30 press the front edge of the interleaving sheet 8a against the curved upper surface of the glass sheet G. Then, the cylinder 25 is operated to lower the holder pad 26 for thereby holding the central portion of the interleaving sheet 8a against the glass sheet G. Now, the interleaving sheet 8a is held in its entirety against the upper surface of the glass sheet G, as shown in FIG. 10. The interleaving sheet 8a is then released from the clamps 23.

The glass G is thereafter passed below the charging electrode 31 by the conveyor belts 1 and electrostatically charged thereby. Accordingly, the interleaving sheet 8a is electrostatically held in close contact with the upper surface of the glass sheet G. The glass sheet G is then positioned or controlled in attitude by the alignment rods 34. At this time, as shown in FIG. 11, the main body 48 of the automatic loading apparatus 44 is in a standby position which is spaced from the pallet 38. The cylinder unit 51 is contracted to pull down the head 50 below the glass sheet G. The balancer cylinder 53 is operated to elevate the rear plate 55 and the front plate 58 linearly for enabling the suction pads 60 to attract the lower surface of the glass sheet G in the position indicated by the broken lines in FIG. 11. Then, the motor 47 is energized to rotate the ball screw 46 about its own axis to move the main body 48 toward the pallet 38, and at the same time, the cylinder unit 51 is operated to lift the head 50 to an upward position. The glass sheet G is now held by the head 50 in a substantially vertical position, as shown in FIG. 5.

If the glass sheet G to be loaded substantially vertically onto the pallet 38 is the first glass sheet to be placed on the pallet 38, the gap between the lower edge of the glass sheet G and the upper surface of the bottom plate 40 of the pallet 38 is not yet determined, and will be adjusted in the range of from 10 to 15 mm in the following manner:

First, the motor 42 of the pallet lifting/lowering mechanism 41 is energized to lift the supports 43 and hence the base 37 and the pallet 38 until the bottom plate 40 of the pallet 38 abuts against the lower edge of the glass sheet G, as shown in FIG. 12. Actually, a pair of spacers (not shown) is fixed to the bottom plate 40, and the lower edge of the glass sheet G abuts against these spacers. The front plate 58 with the suction pads 60 thereon is moved upwardly as it is mounted on the rear plate 55 by the links 57. The limit switch 56 mounted on the upper end of the rear plate 55 is turned on by engagement with the upper end of the front plate 58. The turning-on of the limit switch 56 is detected by a control circuit for the motor 42, whereupon the motor 42 is deenergized. Then, the motor 42 is reversed for a prescribed interval of time to lower the pallet 38 a certain distance, e.g., 10 to 15 mm, from the position in which the bottom plate 40 engages the lower edge of the glass sheet G. Therefore, the gap between the lower edge of the glass sheet G and the upper surface of the bottom plate 40 of the pallet 38 is in the range of from 10 to 15 mm, as shown in FIG. 13.

Then, the motor 47 is operated at a low speed to rotate the ball screw 46 about its own axis to move the main body 48 toward the pallet 38 at a low speed. When the glass sheet G abuts against the back plate 39 of the pallet 38, the suction pads 60 enter the front plate 58, and the actuator member 62 on the lower suction pad 60 triggers the load position detecting limit switch 61. When the limit switch 61 is thus turned on, the glass sheet G is released from the suction pads 60 and loaded on the pallet 38. Subsequently, the motor 47 is energized to move the main body 48 of the automatic loading apparatus 44 away from the pallet 38, and the cylinder unit 51 is contracted to pull down the head 50. The main body 48 is therefore retracted to the standby position shown in FIG. 11. Such retracting movement of the main body 48 is counted by a counter (not shown). Dependent on the count of the counter, the distance by which the main body 48 moves toward the pallet 38 in a next loading cycle is reduced.

The above loading cycle is repeated to load a succession of glass sheets G vertically on the pallet 38. The above operation of the various mechanisms and apparatus is effected in a prescribed sequence by a control unit (not shown).

In the above automatic loading system 100, the glass sheet G is loaded on the pallet 38 while its reverse side is being attracted directly by the suction pads 60. Therefore, even if the glass sheet G is of a greatly curved shape, it can reliably be attracted by the loading apparatus 44.

The interleaving sheet 8 is fully automatically put on the glass sheet G by the interleaving sheet putting apparatus 3. Particularly, the front end of the uppermost interleaving sheet 8a is moved by the supply mechanism 10 to project toward the feed path P and gripped by the clamps 23, and thereafter the interleaving sheet 8a is moved over the glass sheet G and put thereon. Thus, the interleaving sheet 8a can reliably be put on the glass sheet G which may be of a greatly curved shape.

FIG. 14 shows an automatic glass sheet product loading system 200 according to a second embodiment of the present invention. By way of example, a glass sheet product to be loaded is an automotive rear window glass sheet G with silver paste printed in a pattern of defrosting heating wires. The system 200 has a base 201 with support posts 202 attached vertically to the opposite sides thereof. The support posts 202 support thereon frames 203, respectively, extending along a feed path P. Between the frames 203, there are supported a number of shafts 204 rotatable by a motor (not shown) and over which rubber feed rollers 205 are fitted. The shafts 204 rotate to enable the rollers 205 to feed the glass sheet G along the feed path P while keeping the glass sheet G in a horizontal position. The support posts 202 are flanked by outer support posts 206 supporting on their upper ends a transverse frame 207 extending therebetween. Support tables 208 with packing feeders 209 thereon are positioned outside of the support posts 206. Straight feed tubes 210 extend respectively from the packing feeders 209 to a position over the feed path P.

A packing applicator apparatus 211 as shown in FIGS. 15 and 16 is disposed near the distal ends of the feed tubes 210. The packing applicator apparatus 211 has a support plate 212 movably engaging a rail (not shown) extending along the feed path P. The support plate 212 is movable along the feed path P by means of a cylinder unit 218 fixed to the transverse frame 207. A shaft 214 extending perpendicularly to the feed path P is mounted on the support plate 212 for rotation about its own axis. The shaft 214 is coupled to a cylinder unit 215 fixed to the transverse frame 207 through a curved arm 216. The opposite ends of the shaft 214 are coupled to ends of parallel swing arms 217. Therefore, when the cylinder unit 215 is operated, the shaft 214 is rotated about its own axis to enable the swing arms 217 to swing back and forth in vertical planes parallel to the feed path P. A clamp mechanism 218 is attached to the outer surface of each of the swing arms 217. The clamp mechanism 218 has a cylinder unit 219 and a clamp 221 openably and closably coupled to the cylinder unit 219 through links 220. Operation of the cylinder unit 219 causes the links 220 to open and close the clamp 221. When the clamp 221 is closed, a packing 222 projecting from the distal end of the feed tube 210 is gripped thereby.

Figures 17A, 17B:
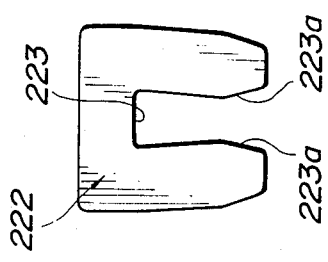
FIGS. 17A and 17B are views of two different packing types to be mounted on a glass sheet product.

As shown in FIGS. 17A and 17B, the packing 222 is substantially in the form of a rectangular parallelopiped which can easily be clamped. More specifically, the packing 222 shown in FIG. 17A is designed for use on a glass sheet having a thickness ranging from 3.5 to 4.0 mm, and the packing 222 shown in FIG. 17B is designed for use on a glass sheet having a thickness ranging from 5.0 to 6.0 mm. Each of the packings 222 shown in FIGS. 17A and 17B has a substantially channel-shaped recess 223 for receiving an edge of the glass sheet G. The packing 222 has sides 223a on opposite sides of the recess 223, the sides 223a having blunt edges projecting toward each other for allowing the edge of the glass sheet G to enter the recess 223 easily and also for enabling the packing 222 to clamp the glass sheet G reliably.

As shown in FIGS. 15 and 16, a glass alignment apparatus 224 is disposed downstream of the packing applicator apparatus 211 in the direction of travel of glass sheets G down the feed path P. The alignment apparatus 224 serves to align a glass sheet G such that packings 222 will be mounted on the glass sheet G at constant positions. The alignment apparatus 224 is supported on the transverse frame 207 and has a first alignment mechanism 225 for positioning the glass sheet product G in a direction perpendicular to the feed path P and a second alignment mechanism 226 for positioning the glass sheet product G along the feed path P. The first alignment mechanism 225 has a cylinder unit 227 supported on the transverse frame 207 for moving a first rack 228 transversely. The first rack 228 is in mesh with a pinion 231 meshing with a second rack 232. Thus, when the first rack 228 is moved transversely for a distance, the second rack 232 is also moved transversely for the same distance in the opposite direction. Outer ends of the first and second racks 228, 232 are attached to rollers 230, 234 through arms 229, 233, respectively. Upon operation of the cylinder unit 227, the rollers 230, 234 move in unison outwardly or inwardly. When the rollers 230, 234 move inwardly, the transverse center of the glass sheet G is located at a prescribed position at all times. The second alignment mechanism 226 has a cylinder unit 238 supported vertically on the transverse frame 207 for vertically moving a transverse shaft 235 through an arm 237. Rollers 236 are mounted on the respective opposite ends of the shaft 235. In response to operation of the cylinder unit 238, the rollers 230, 234 are vertically moved through the arm 237 and the shaft 235. The first alignment mechanism 225 can accommodate various glass sheets of different transverse dimensions or widths. The second alignment mechanism 226 may be suitably positioned in the direction of the feed path P to meet the profile of glass sheets to be aligned.

Figure 18:
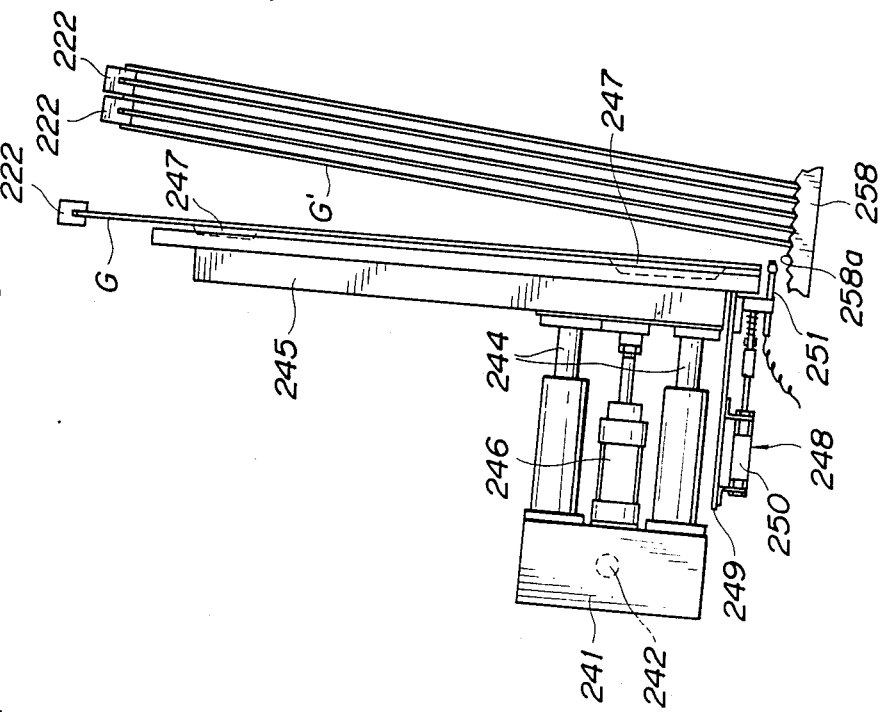
FIG. 18 is a view showing the manner in which a glass sheet product is loaded onto a pallet by the automatic loading apparatus shown in FIG. 14.

An automatic loading apparatus 239 is disposed below the alignment apparatus 224. As shown in FIG. 14, the automatic loading apparatus 239 has a frame-like movable body 240 with its front end tilted downwardly along the feed path P. The movable body 240 is movable on the base 201 along the feed path P. A support 241 is mounted on the front end of the movable body 240 through a shaft 242. Between the support 241 and the movable body 240, there is connected a cylinder unit 243 for turning the support 241 about the shaft 242. As shown in FIG. 18, a pair of laterally spaced plates 245 is supported on the front face of the support 241 through respective guide rods 244. Inching cylinder units 246 are connected between the support 241 and the plates 245, the inching cylinder units 246 being operable independently of each other. Suction pads 247 communicating with a vacuum suction mechanism (not shown) are mounted on the plates 245 at their upper and lower portions. A mechanism 248 for detecting the last glass sheet loaded on a pallet is mounted on the lower end of each of the plates 245. The detecting mechanism 248 comprises a cylinder unit 250 attached to the lower surface of a support plate 249 extending rearwardly from the plate 245, and a fiber sensor 251 mounted on the end of the cylinder unit 250 and positioned immediately below a glass sheet G attracted by the pads 247.

The fiber sensor 251 has a light-emitting element and a light-detecting element and measures the distance between itself and a glass sheet G' positioned in front of the fiber sensor 251 based on the amount of light detected thereby.

A pallet exchanger 252 is disposed downstream of the loading apparatus 239. As shown in FIG. 14, the pallet exchanger 252 has a rotary table 253 having a pair of rails 254 mounted on its upper surface. A pair of pallets 255, disposed back to back, is placed on the rails 254 in engagement therewith. The loading apparatus 239 releases a glass sheet G at a constant position at all times. One of the pallets 255 is first positioned at a prescribed location in the feed path P, and moved in increments away from the loading apparatus 239 by an inching mechanism (not shown) each time the pallet 255 receives a glass sheet G.

Each pallet 255 comprises a bottom plate 257 and a back plate 256 normal to the bottom plate 257. The pallet 255 is inclined such that one side of the bottom plate 257 is higher than the opposite side thereof along the feed path P. A pair of parallel spacers 258 is fixed to the bottom plate 257. The spacers 258 are brought into parallel relationship to the feed path P when the pallet 255 is aligned with the feed path P. Each of the spacers 258 has a plurality of equally spaced grooves 258a defined in its upper surface for receiving the lower edges of glass sheets G.

Operation of the automatic loading system 200 is as follows:

A glass sheet product G as it lies horizontally is fed along the feed path P by means of the feed rollers 205 to a position below the packing applicator 211 and the alignment apparatus 224. At this time, the rollers 236 of the alignment apparatus 224 have been lowered in the feed path P. The front edge of the glass sheet G that has been fed along abuts against the rollers 236, which automatically position the glass sheet G in the direction along the feed path P. The lateral rollers 230, 234 which have been moved outwardly are moved inwardly by the cylinder unit 227 at the time the front edge of the glass sheet G is engaged by the rollers 236.

Simultaneously with such positioning of the glass sheet G, the cylinder unit 213 of the packing applicator 211 is actuated to retract the support plate 212 back to the position of FIG. 15. At the same time, the cylinder unit 215 is operated to turn the swing arms 217 rearwardly and upwardly, and the cylinder units 219 are operated to open the clamps 221 at the supply holes of the feed tubes 210. Then, one packing 222 is pushed out of each of the feed tubes 210 and clamped by the clamp 221. The cylinder unit 213 is extended to move the support plate 212 forwardly. The cylinder unit 215 is also extended to turn the shaft 214 to swing the swing arms 217 forwardly and downwardly. As a result, as shown in FIG. 16, the packings 222 clamped by the clamps 221 are fitted over the rear edge of the glass sheet G. Thereafter, the packings 222 are released from the clamps 221. The cylinders 227, 238 of the alignment apparatus 224 are operated to displace the rollers 230, 234 outwardly and to move the rollers 236 upwardly. Therefore, the glass sheet G is released from the alignment apparatus 224, and then transferred to a position above the automatic loading apparatus 239.

The packings 222 are mounted on every other glass sheet G by using a counter which counts glass sheets G which are delivered down the feed path P.

Prior to arrival of a glass sheet G, the movable body 240 of the loading apparatus 239 is moved from the position of FIG. 14 away from the pallet 255, and the cylinder 243 is contracted to direct the plates 245 upwardly. More specifically, the support 241 is turned about 90° counterclockwise about the shaft 242 from the position of FIG. 18, with the plates 245 positioned below the glass sheet G. The cylinder units 246 are also contracted. When the glass sheet G is moved to a position above the plates 245, the cylinder units 246 are extended to cause the suction pads 247 to attract the lower surface of the glass sheet G, the upper surface of which is printed with silver paste, as described above.

Then, the cylinder unit 243 is extended while the movable body 240 is being advanced toward the pallet 255. The support 241 is rotated about the shaft 242 until the glass sheet G is raised substantially vertically. Then, the cylinder units 246 are separately extended. At the time the fiber sensors 251 detect prescribed distances between themselves and a previously loaded glass sheet G', the cylinder units 246 are inactivated. Then, the cylinder unit 250 is contracted to retract the fiber sensor 251. The glass sheet G is released from the suction pads 247 to allow the lower edge of the glass sheet G to engage in grooves 258a of the spacers 258. Since the packings 222 are mounted on every other glass sheet G, the upper edge of the glass sheet G is not held in abutment against the upper edge of the previous glass sheet G'. The fiber sensor 251 is associated with each of the plates 245, so that parallelism between the glass sheet G and the previous glass sheet G' can reliably be detected. Therefore, the lower edge of the glass sheet G reliably engages in the grooves 258a of the spacers 258.

The above cycle of operation is repeated until a desired number of glass sheets G are loaded on a single pallet 255. After all desired glass sheets G have been loaded on the pallet 255, the table 253 is rotated 180° to turn an empty pallet 255 to the glass receiving position. The loaded pallet 255 is transferred to a prescribed position, and a new empty pallet 255 is set on the table 253. The mechanisms and apparatus of the system 200 are operated according to a control sequence by a control unit (not shown).

In the loading system 200, the distance between the glass sheet G to be loaded and the previously loaded glass sheet G' is measured by the sensors 251 of the detecting mechanism 238 for loading the glass sheet G parallel to the previous glass sheet G. Therefore, the lower edge of the glass sheet G is allowed to engage reliably in the grooves 258a of the spacers 258, with the result that a prescribed number of glass sheets G can accurately be loaded on the pallet 255. The back of the glass sheet G is directly attracted by the suction pads 247 when loading the glass sheet G on the pallet 255. Therefore, a glass sheet product printed with silver paste or the like on its face can be loaded on the pallet 255 without peeling off the printed silver paste.

While automotive window glass sheets have been described as glass sheet products to be loaded, the principles of the present invention are also applicable to loading systems for glass sheet products of other types. Interleaving sheets may be of synthetic resin such as vinyl, rather than paper.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A system for automatically loading glass sheet products one by one onto a pallet, comprising:
    a conveyor apparatus for delivering a substantially horizontally oriented glass sheet product along a feed path to a terminal position of the feed path;
    an automatic loading apparatus for automatically loading the delivered glass sheet product onto the pallet; and
    said automatic loading apparatus comprising a main body movable between said terminal position and a loading position for loading the glass sheet product onto said pallet, and a suction mechanism mounted on said main body for attracting the lower surface of said glass sheet product at said terminal position and for releasing the lower surface of said glass sheet product at said loading position to load the glass sheet product onto said pallet,
    wherein said suction mechanism comprises a head angularly movably mounted on said main body, an extensible and contractible cylinder connected between said main body and said head, a plate assembly mounted on said head and movable away therefrom, an extensible and contractible balancer cylinder connected between said head and said plate assembly for moving said plate assembly linearly away from said head, and suction pads mounted on said plate assembly whereby rubbing of one glass sheet product, already loaded on the pallet, by a glass sheet product being subsequently loaded thereon, is reduced.

2. A system according to claim 1, wherein said conveyor apparatus comprises upstream conveyor means and downstream conveyor means, said upstream conveyor means being lower than said downstream conveyor means, further including lifter means for lifting a glass sheet product from said upstream conveyor means to said downstream conveyor means while said glass sheet product is being conveyed along said feed path.

3. A system according to claim 1 wherein said loading apparatus comprises means for causing said suction mechanism to release the lower surface of said glass sheet product substantially horizontally at said loading position.

4. A system according to claim 1 wherein said head is rotatably mounted on said main body, including a pivotal coupling for rotation of said head, said extensible and contractable cylinder operable for rotating said head about said pivotal coupling.

5. A system for automatically loading glass sheet products one by one onto a pallet, comprising:
    a conveyor apparatus for delivering a substantially horizontally oriented glass sheet product along a feed path to a terminal position of the feed path;
    an automatic loading apparatus for automatically loading the delivered glass sheet product onto the pallet; and
    said automatic loading apparatus comprising a main body movable between said terminal position and a loading position for loading the glass sheet product onto said pallet, and a suction mechanism mounted on said main body for attracting the lower surface of said glass sheet product at said terminal position and for releasing the lower surface of said glass sheet product at said loading position to load the glass sheet product onto said pallet, said suction mechanism comprising a head angularly movably mounted on said main body, an extensible and contractable cylinder connected between said main body and said head, a plate assembly mounted on said head and movable away therefrom, an extensible and contractable balancer cylinder connected between said head and said plate assembly, and suction pads mounted on said plate assembly, wherein said plate assembly of said suction mechanism comprises a rear plate mounted on said head movably therefrom, a front plate, and links connecting said front plate relatively movably to said rear plate;

said suction pads being resiliently mounted on said front plate movably thereto;

said pallet comprising a bottom plate and a back plate mounted on said bottom plate;

said suction mechanism further including a first limit switch mounted on said rear plate for detecting relative movement of said front plate with respect to said rear plate to detect when said glass sheet product attracted by said suction pads contacts said bottom plate of said pallet for thereby detecting the height of said pallet.

6. A system according to claim 5, further including a second limit switch for detecting movement of said suction pads toward said front plate to detect when said glass sheet product attracted by said suction pads contact said back plate of said pallet or a previously loaded glass sheet product for thereby detecting said loading position.

7. A system for automatically loading glass sheet products one by one onto a pallet, comprising:
   a conveyor apparatus for delivering a substantially horizontally oriented glass sheet product along a feed path to a terminal position of the feed path;
   an automatic loading apparatus for automatically loading the delivered glass sheet product onto the pallet; and
   said automatic loading apparatus comprising a main body movable between said terminal position and a loading position for loading the glass sheet product onto said pallet, and a suction mechanism mounted on said main body for attracting the lower surface of said glass sheet product at said terminal position and for releasing the lower surface of said glass sheet product at said loading position to load the glass sheet product onto said pallet, and
   including a further apparatus for putting an interleaving sheet on an upper surface of said glass sheet product in said feet path, said further apparatus comprising:
   an interleaving sheet supply mechanism disposed on one side of said feed path for moving one side of an uppermost interleaving sheet of a stack of interleaving sheets from the remaining interleaving sheets toward said feed path;
   a clamp mechanism for gripping said one side of said uppermost interleaving sheet;
   a mechanism for moving said clamp mechanism beyond said glass sheet product in said feet path to one side of said glass sheet product thereby to move said uppermost interleaving sheet over said glass sheet product; and
   a holder mechanism for holding said uppermost interleaving sheet against the upper surface of said glass sheet product.

8. A system according to claim 7, wherein said glass sheet products have a curved portion, said holder mechanism further including tracing arms for holding said uppermost interleaving sheet against the upper surface of the curved portion of said glass sheet product.

9. A system for automatically loading glass sheet products one by one onto a pallet, comprising:
   a conveyor apparatus for delivering a substantially horizontally oriented glass sheet product along a feed path to a terminal position of the feed path;
   an automatic loading apparatus for automatically loading the delivered glass sheet product onto the pallet; and
   said automatic loading apparatus comprising a main body movable between said terminal position and a loading position for loading the glass sheet product onto said pallet, and a suction mechanism mounted on said main body for attracting the lower surface of said glass sheet product at said terminal position and for releasing the lower surface of said glass sheet product at said loading position to load the glass sheet product onto said pallet,
   wherein said pallet has at least a pair of spacers having spaced grooves defined therein for receiving the lower edges of said glass sheet products, said suction mechanism comprising a support angularly movably mounted on said main body, an extensible and contractible cylinder connected between said support and said main body, a pair of plates mounted on said support movably therefrom, extensible and contractible cylinders connected between said support and said plates, suction pads mounted on at least one of said pair of plates, and detectors mounted on said plates for detecting distances between said glass sheet product attracted to said suction pads and a glass sheet product previously loaded on said pallet, and wherein each of said suction pads releases said glass sheet product to allow the lower edge of said glass sheet product to engage in said grooves of said spacers when the distances as detected by said detectors between said glass sheet product attracted to said suction pads and the glass sheet product previously loaded on said pallet are equal to prescribed distances.

10. A system according to claim 9, wherein said glass sheet product has a printed pattern on a surface thereof which is directed upwardly while the horizontally oriented glass sheet product is delivered along said feed path, further including an apparatus for applying packings to an edge of said glass sheet product in said feed path.

11. A system for automatically loading glass sheet products one by one onto a pallet comprising:
    a conveyor apparatus for delivering a substantially horizontally oriented glass sheet product along a feed path to a terminal position of the feed path;
    an automatic loading apparatus for automatically loading the delivered glass sheet product onto the pallet; and
    said automatic loading apparatus comprising a main body movable between said terminal position and a loading position for loading the glass sheet product onto said pallet, and a suction mechanism mounted on said main body for attracting the lower surface of said glass sheet product at said terminal position and for releasing the lower surface of said glass sheet product at said loading position to load the glass sheet product onto said pallet, further including a sheet putting apparatus for putting an interleaving sheet on an upper surface of said glass sheet product in said feed path, wherein said sheet putting apparatus comprises first means for attracting an interleaving sheet from a stack of interleaving sheets, second means for displacing the interleaving sheet attracted by said first means to the glass sheet product being conveyed along said feed path, and third means for holding the interleaving sheet against an upper surface of the glass sheet product being conveyed.

12. A system according to claim 11 wherein said first means comprises sheet suction means for attracting said interleaving sheet and fluid separating means for separating said interleaving sheet from said stack of interleaving sheets.

13. A system according to claim 12 wherein said second means comprises first moving means for moving said sheet suction means forwardly to said feed path, clamping means located forwardly of said stack for clamping said interleaving sheet after being moved by said sheet suction means to said feed path, and second moving means for moving said clamping means towards said feed path after clamping said interleaving sheet.

14. A system according to claim 13 wherein said third means comprises holder cylinder means actuated after movement of said interleaving sheet to said feed path and holder pads actuated by said holder cylinder means for holding said interleaving sheet against said glass sheet product.

15. A system according to claim 14 wherein said second means further comprises release means operable after actuation of said holder cylinder means for releasing said clamping means.

16. A system according to claim 15 further comprising electrostatic charging means for charging said glass sheet product thereby to attract said interleaving sheet thereto subsequent to release of said clamping means.

17. A system according to claim 11 further comprising electrostatic charging means for charging said glass sheet product thereby to attract said interleaving sheet thereto subsequent to displacement of said interleaving sheet to said glass sheet product by said second means.

* * * * *